US008885532B2

(12) United States Patent
Wang et al.

(10) Patent No.: US 8,885,532 B2
(45) Date of Patent: Nov. 11, 2014

(54) METHOD AND DEVICE FOR CONTROLLING MBMS RECEIVING IN A WIRELESS COMMUNICATION SYSTEM

(75) Inventors: He Wang, Shanghai (CN); Yu Chen, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 252 days.

(21) Appl. No.: 13/318,046

(22) PCT Filed: Apr. 28, 2009

(86) PCT No.: PCT/CN2009/000461
§ 371 (c)(1),
(2), (4) Date: Oct. 28, 2011

(87) PCT Pub. No.: WO2010/124417
PCT Pub. Date: Nov. 4, 2010

(65) Prior Publication Data
US 2012/0039228 A1   Feb. 16, 2012

(51) Int. Cl.
*G08C 17/00*   (2006.01)
*H04W 76/00*   (2009.01)

(52) U.S. Cl.
CPC ................................. *H04W 76/002* (2013.01)
USPC .......................................................... 370/311

(58) Field of Classification Search
CPC .................................................. H04W 76/002
USPC .................................... 370/311, 312; 709/219
See application file for complete search history.

(56) References Cited

U.S. PATENT DOCUMENTS

| 6,996,077 B1* | 2/2006 | Suenaga et al. ............... 370/320 |
| 2008/0205322 A1* | 8/2008 | Cai et al. ....................... 370/312 |
| 2011/0019605 A1* | 1/2011 | Ma et al. ........................ 370/312 |

FOREIGN PATENT DOCUMENTS

| CN | 101272518 A | 9/2008 |
| WO | WO2007078164 A1 | 7/2007 |
| WO | WO2010/124417 A1 | 11/2010 |

OTHER PUBLICATIONS

Alcatel-Lucent Shanghai Bell, Alcatel-Lucent, "Notification Mechanism Design for eMBMS," 3GPP TSG-RAN WG2 #66 R2-093095, Apr. 27, 2009.
3rd Generation Partnership Project, "Technical Specification Group Radio Access Network, Radio Resource Control (RRC), Protocol specification (Release 8)," 3GPP TS 25.331, Section 10.2.16j, pp. 535-538, Section 10.3.9a.12, p. 1027, Mar. 2009.

(Continued)

*Primary Examiner* — Wei Zhao
(74) *Attorney, Agent, or Firm* — Fay Sharpe LLP

(57) ABSTRACT

The present invention provides a method of receiving a multimedia broadcast/multicast service in a user equipment of a wireless communication system based on MBSFN transmission and a method of assisting the user equipment to receive the service in the corresponding base station; wherein the user equipment receives a transport block from the base station in a predefined period; and then judges whether a notification indicator in the transport block is activated, if so, then judges whether a service identification of a multimedia broadcast/multicast service subscribed to by the user equipment is included in a transport block including a control signaling in the transport block, if so, then receives the multimedia broadcast/multicast service. By implementing the present invention, a user terminal in IDLE mode only needs a predefined period such as a DRX period to wake up to receive the notification indicator to judge whether a new service will start without waking up at extra time.

15 Claims, 6 Drawing Sheets

(56) References Cited

OTHER PUBLICATIONS

Alcatel-Lucent Shanghai Bell, Alcatel-Lucent, "Considerations on MCCH Transmission Scheme," 3GPP TSG-RAN WG2 #66 R2-093094, Apr. 27, 2009.

International Search Report for PCT/CN2009/000461 dated Feb. 11, 2010.

Written Opinion of the International Searching Authority, Int'l App. No. PCT/CN2009/000461, Int'l Filing Date Apr. 28, 2009, Authorized Office Qi, Lin, Completed Jan. 28, 2010.

Int'l Preliminary Report on Patentability, Int'l App. No. PCT/CN2009/000461, Int'l Filing Date Apr. 28, 2009, Authorized Office Qi, Lin, Issued Nov. 1, 2011.

\* cited by examiner

METHOD AND DEVICE FOR CONTROLLING MBMS RECEIVING IN A WIRELESS COMMUNICATION SYSTEM

FIELD OF THE INVENTION

The present invention relates to a wireless communication system, especially to the wireless communication system based on MBSFN (Multicast Broadcast Single Frequency Network) transmission.

BACKGROUND OF THE INVENTION

MBMS (Multimedia Broadcast/Multicast Service) is a service introduced in 3GPP Release 6. MBMS is a technique of transmitting data from a data source to a plurality of user equipments via sharing network resource, which can use the network resource effectively and implement the broadcast and multicast of the multimedia service with relative high speed while providing the multimedia service.

In 3GPP Release 6, before starting to send a new service, a base station sends notification indicators via a MICH channel (MBMS Indicator Channel), to inform a plurality of relevant user terminals that a new service starts currently. After notification indicators is detected by a user terminal in IDLE mode, the user terminal in IDLE mode starts to receive and decode the Multicast Control Channel (MCCH) message to judge whether the current new service is the service subscribed to by itself. If the current new service is the service subscribed to by the user terminal, then the user terminal starts to receive data of the new service on the corresponding time-frequency resource. If the current new service is not the service subscribed to by the user terminal, then the user terminal continues to detect notification indicators in the MICH channel and receive the MCCH message based on the notification indicators, to judge whether the upcoming new service is the service subscribed to by it.

Although MBMS has made complete implementation in 3G systems of Release 7 and Release 6 after long-term research and development, it still can not meet the increasing service demand, especially the strong demand for mobile TV service from users and operators. With starting to make the Release 8, on one hand for further improving MBMS service performance, on the other hand for adapting new SAE/LTE (System Architecture Evolution/Long Term Evolution) system, MBMS performs dramatic improvement in the aspect of logic architecture, service mode, transmission style and channel structure, etc.

Based on this, it is quite necessary to provide a new notification mechanism.

SUMMARY OF THE INVENTION

For aforesaid problems in the prior art, there is provided a method and device for receiving a MBMS in a user equipment of a wireless communication system based on MBSFN transmission, and accordingly a method and device for assisting a user equipment to receive a MBMS in a base station of a wireless communication system based on MBSFN transmission.

According to the first aspect of the present invention, there is provided a method of receiving a MBMS in a user equipment of a wireless communication system based on MBSFN transmission, wherein the method comprises the following steps of: a. receiving a transport block from a base station in a predefined period; b. judging whether a notification indicator in the transport block is activated; c. judging whether a service identification of a MBMS subscribed to by the user equipment is included in a transport block including a control signaling in the transport block, if the notification indicator is activated; d. receiving the MBMS, if the service identification of the MBMS subscribed to by the user equipment is included in the transport block including the control signaling.

According to the second aspect of the present invention, there is provided a method of assisting a user equipment to receive a MBMS in a base station of a wireless communication system based on MBSFN transmission, wherein the method comprises the following steps of: A. activating a notification indicator in a transport block that is sent at starting time of a predefined period, before starting to transmit a new MBMS; B. sending the transport block.

According to the third aspect of the present invention, there is provided a control device for controlling to receive a MBMS in a user equipment of a wireless communication system based on MBSFN transmission, wherein the control device comprises: a first receiving means, for receiving a transport block from a base station in a predefined period; a first judging means, for judging whether a notification indicator in the transport block is activated; a second judging means, for judging whether a service identification of a MBMS subscribed to by the user equipment is included in a transport block including a control signaling in the transport block, if the notification indicator is activated; a second receiving means, for receiving the MBMS, if the service identification of the MBMS subscribed to by the user equipment is included in the transport block including the control signaling.

According to the fourth aspect of the present invention, there is provided an assisting control device for assisting a user equipment to control to receive a multimedia broadcast/multicast service in a base station of a wireless communication system based on MBSFN transmission, wherein the assisting control device comprises: an activating means, for activating a notification indicator in a transport block that is sent at starting time of a predefined period, before starting to transmit a new multimedia broadcast/multicast service; a sending means, for sending the transport block.

In the technical solution of the present invention, before a new service starts, the base station will activate the notification indicator only in a predefined period, for example a DRX period. Therefore, a user equipment in IDLE mode only needs to wake up in a predefined period, for example a DRX period, to receive the notification indicator to judge whether a new service starts, if so, the user equipment further judges whether the new service is the service subscribed to by it according to the simultaneously received MCCH control signaling. Usually, a DRX (Discontinuous Reception) period is multiple of MP (Modification Period).

For user equipment which has started to receive service data, it should take MP as the receiving period to receive the MCCH control signaling to judge whether the MCCH control signaling is updated. Therefore, for such user equipment, it also will not miss the receiving of the notification indicator.

BRIEF DESCRIPTION OF THE DRAWINGS

By reading the detailed description of the non-limiting embodiments with reference to the following drawings, other objects, features and advantages of the present invention will become apparent.

In drawings, same or similar reference signs refer to the same or similar step feature/device (module).

DETAILED DESCRIPTION OF EMBODIMENTS

When MBMS data, for example, data transmitted on a MTCH (Multicast Traffic Channel) is transmitted in the form of MBSFN, and the MTCH is mapped on a MCH (Multicast Channel), MCH is mapped on a PMCH (Physical Multicast Channel).

MTCH service data is transmitted in the form of MBSFN, which means that the RS (Reference Signal) and scramble are the same in the MB SFN field and signals, which are from different base stations and transmitted in the form of MBSFN, superimpose naturally in the air, since the RS and scramble are the same in the whole MBSFN field, a UE (User Equipment) performs a combined MBSFN channel estimation by using the uniform RS, that is, the UE directly demodulates and decodes the combined signal without distinguishing from which base station is the combined signal on earth.

When the MCCH and MTCH are both mapped on the MCH, which means that the MCCH and MTCH can only be carried on a MBSFN sub-frame. If there is not only MCCH transmission but also MTCH transmission in a MBSFN sub-frame, when the MTCH uses the MBSFN transmission mode, it means that the MCCH also needs to use the MBSFN transmission mode. Otherwise, if the MCCH uses non-MBSFN transmission mode, the transmission of MTCH data, which is in the same MBSFN sub-frame and transmitted in the MBSFN transmission mode, will be influenced, for example, it is unable to allocate the same resource for the MTCH data, belonging to the same MBSFN sub-frame as the MCCH control signaling, in different eNBs. Furthermore, as discussed hereinbefore, the UE detects the received signals by using the combined MBSFN, therefore, if different eNBs do not use MBSFN transmission mode to transmit data in the MCH, the UE can not demodulate and decode the received data correctly.

Hereinafter, implementations of transmitting the MCCH control signaling in the MBSFN transmission mode are described in each detailed embodiment.

A First Embodiment

Figure 1:
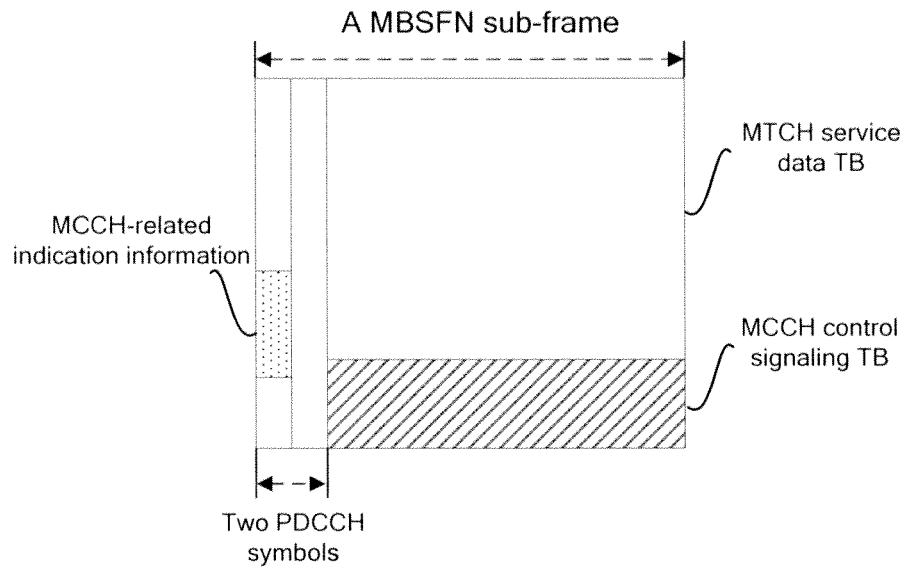
FIG. 1 shows a schematic diagram of MBSFN sub-frame structure for transmitting a MCCH control signaling, according to a first embodiment of the present invention.

FIG. 1 shows a schematic diagram of transmission mode of a MCCH control signaling, according to a first embodiment of the present invention.

A MBSFN sub-frame is 1 ms, that is, a TTI (Transmission Time Interval). 12 symbols such as 12 OFDM symbols are included in a sub-frame.

Wherein the prior 2 symbols in a MBSFN sub-frame cannot be used for MBSFN transmission, but needs to be reserved to transmit PHICH (Physical HARQ Indication Channel), CRS (Common Reference Signal), etc, so that the unicast user performs switching among cells, load balancing or the measurement of interference coordination, therefore, the prior 2 symbols of a MBSFN sub-frame may be taken as PDCCH (Physical Downlink Control Channel) symbol.

Figure 2:
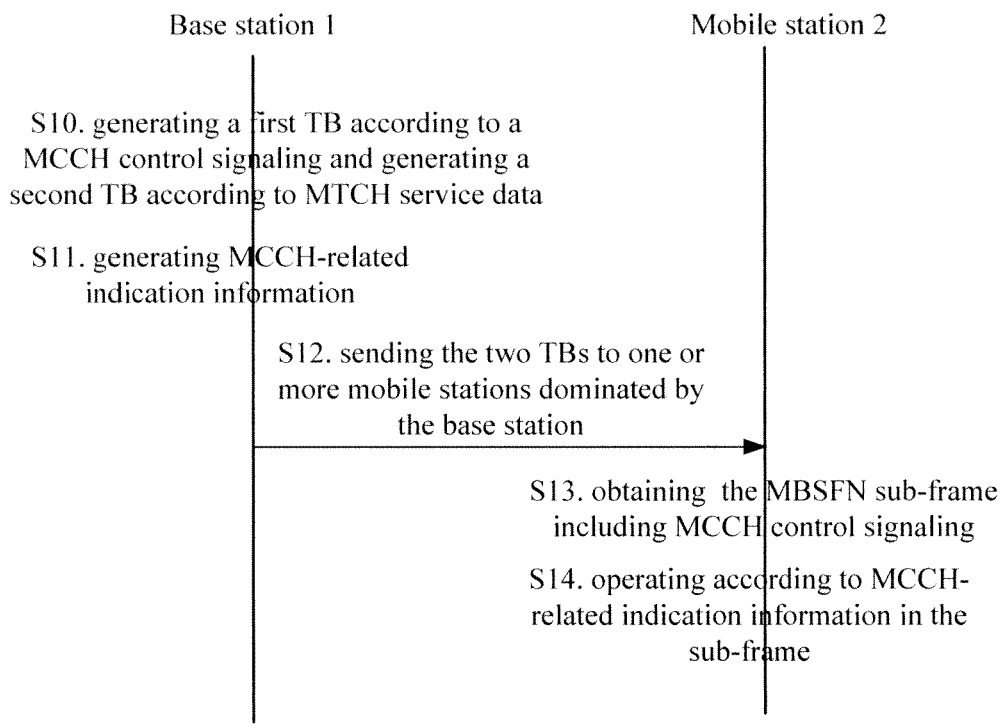
FIG. 2 shows a flowchart of a method according to the first embodiment of the present invention.

Hereinafter, the method flow of the first detailed embodiment is described as follows in combination with FIG. 2 and referring to FIG. 1. As shown in FIG. 2, in the step S10, a base station generates a first TB (Transport Block) according to a MCCH control signaling, that is, MCCH control signaling TB, and generates a second TB according to MTCH service data, that is, MTCH service data TB. Therefore, as shown in FIG. 1, MCCH control signaling and MTCH service data are multiplexed in a same sub-frame in the form of two TBs. Those skilled in the arts should understand that the two rectangles of the first TB and the second TB shown in FIG. 1 are only examples, the first TB may be mapped on one or more RBs (Resource Block) which may be discrete; the second TB may be mapped on one or more RBs which may be discrete. Therefore, actually, the patterns mapped in the MBSFN sub-frame by RBs may be irregular.

After then, in the step S11, the base station generates MCCH-related indication information in the sub-frame. The MCCH-related indication information comprises for example DCI (Downlink Control Indication) and MBMS-RNTI (MBMS-Radio Network Temporary Identifier). The DCI and MBMS-RNTI information may be in the PDCCH symbol.

Wherein DCI format 4 is defined, and comprises the following information:
  information of RBs occupied by MCCH, that is, position information of MCCH signaling;
  MCS (Modulation and Coding Scheme) of MCCH;
  in another embodiment, DCI format 4 may also comprise notification indicator of new service, hereinafter to be referred as "notification indicator".

The new defined DCI format 4 considers the necessary indication information for dynamically scheduling the MCCH control signaling, thus neglects some other parameters defined in other DCI formats. Certainly, the defined DCI format 1, 2, etc versions may also be reused.

Noticeably, the base station may accurately determine the RBs occupied by MCCH according to the actual data amount of MCCH to implement dynamic scheduling for MCCH TBs; and the base station may dynamically determine MCS of MCCH according to MCCH required QoS information, etc.

MCCH-related indication information also comprises MBMS-RNTI. In order to provide reliable transmission, CRC (Cyclic Redundancy Check) may be performed for DCI. When the base station performs CRC operation for DCI, RNSI is added in CRC for mask. RNTI comprises paging-RNTI, MBMS-RNTI, S-RNTI, user specific RNTI, etc, each RNTI has a definite value, which is specified in the relevant protocol and not be repeated here again. The base station knows what the data to be scheduled by it is, thus it will add the corresponding RNTI during CRC according to the actual data to be scheduled.

Then, in the step S12, the base station transmits the two TBs to the physical layer via the transmission channel MCH, and sends them to one or more UEs dominated by the base station.

Considering the reliability of transmission, power saving mode of UE and prevention of missing the receiving of MCCH control signaling, the base station needs to use a period transmission mechanism of MP (Modification Period) and RP (Repetition Period). A MP equals to a scheduling period, and a MP equals to a plurality of RPs. For example, four or eight RPs are included in a MP. Ideally, the base station sends the MCCH message in the first MB SFN sub-frame from the start of each MP or RP and does not send the MCCH signaling in other MBSFN sub-frames. Certainly, since the distribution of the MB SFN in a scheduling period is discrete, for example, the sub-frame corresponding to the first period of MP may not perform MB SFN transmission, and it is specified that the MCCH control signaling must be transmitted in the form of MBSFN, it is possible for such a scenario that RB starts from the $40^{th}$ sub-frame and MCCH may be sent in the $39^{th}$ or $41^{st}$ sub-frame (closed occasion), wherein the $39^{th}$ or $41^{st}$ sub-frame is the MBSFN sub-frame. That is, the MCCH control signaling is sent to the UE only in the MBSFN sub-frame nearest to the start of MP and RP (Repetition Period). Certainly, for how to define the nearest MBSFN sub-frame, selecting the prior or latter MBSFN sub-frame nearest to the start of MP/RP to transmit the MCCH control signaling message is agreed by system, and the way of selecting for each base station should keep consistent with each other. The MCCH message sent in each RP by the base station is the same, till MCCH message is updated, the MCCH message is updated in the MBSFN sub-frame nearest to the start of the MP, then, the updated MCCH message is sent periodically and repeatedly in the latter RP.

The base station may expand the system message to add the options of configuration of MP and RP, and presends to the UE the system message including MP and RP.

Then, in the step S13, the HE firstly receives from the base station the MBSFN sub-frame including MCCH control signaling in the period scheduled by MP and RP.

Then, in the step S14, the UE firstly reads the PDCCH symbol of the MBSFN sub-frame, if the UE finds the DCI indication information, it will firstly perform CRC validation for the DCI information. After the CRC validation, the UE may obtain the corresponding RNTI value to further judge whether it is needed to decode the MCCH control signaling message. If it is needed to decode and demodulate the MCCH control signaling message, then the UE accordingly performs the subsequent operation such as decoding or demodulation, etc, according to the modulation and coding mode of the MCCH message included in the PDCCH symbol.

Those skilled in the art may understand that there is no clear order for the step S10 and S11 in the embodiment and the order given hereinbefore is only an implementation. The base station may also generate the MCCH-related indication information firstly and then generates two TBs multiplexed in a MBSFN sub-frame according to the MCCH control signaling and the MTCH service data.

In order to simplify the aforesaid indication mechanism defined in the PDCCH symbol and guarantee synchronization of the resources allocated for the MCCH control signaling, the following regulation may be defined:

before allocating resource for the MTCH service data, firstly allocating resource for the MCCH control signaling, and starting to allocating resource for the MCCH control signaling at the start of the PMCH RB;

considering that at most only one MCCH transport block and one MTCH transport block can be transmitted in a MB SFN sub-frame, and once the resource allocated for the MCCH control signaling is determined, the rest resources are all used for the resource allocation of the MTCH service data, therefore, only resource allocation information of the MCCH control signaling needs to be indicated and the resource allocation information of the MTCH service data does not need to be indicated in PDCCH.

If there is no MCCH control signaling transmission in current MBSFN sub-frame, the resource will not be allocated for MCCH and DCI of MCCH does not appear in PDCCH symbol as well.

The advantages of the first detailed embodiment are:
providing more effective and flexible transmission mode for the MCCH control signaling and the MTCH service data;
inheriting the service scheduling indication of unicast in PDCCH, and thus keeping the consistent design with unicast.

However, for the implementation of the first detailed embodiment, DCI for indicating MCCH resource allocation as well as modulation and coding mode needs to be defined.

A Second Embodiment

Figure 3:
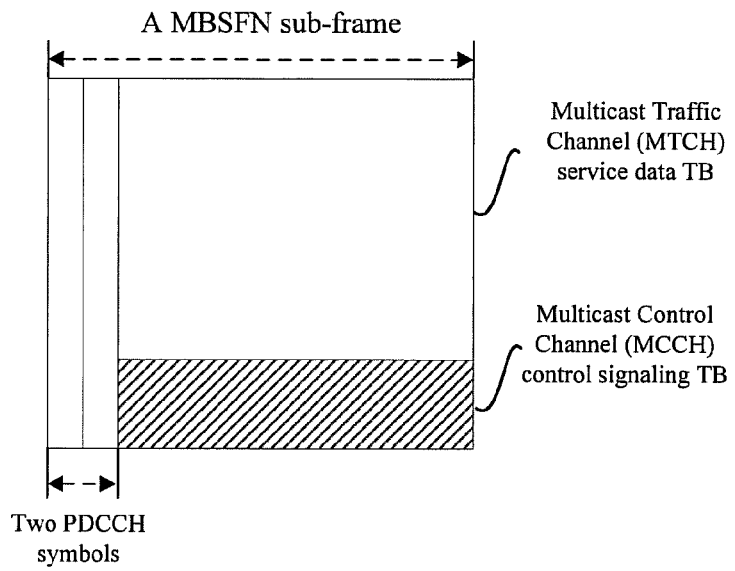
FIG. 3 shows a schematic diagram of MBSFN sub-frame structure for transmitting a MCCH control signaling, according to a second embodiment of the present invention.
Figure 4:
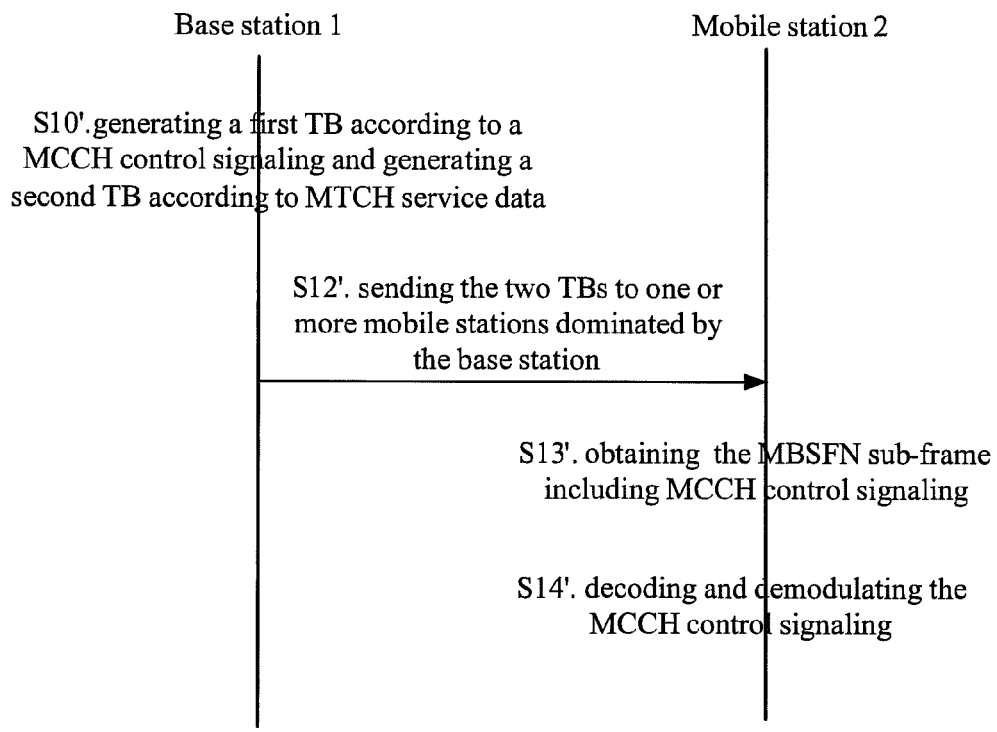
FIG. 4 shows a flowchart of a method according to the second embodiment of the present invention.

FIG. 3 shows a schematic diagram of MBSFN sub-frame structure for transmitting a MCCH control signaling, according to a second embodiment of the present invention, and FIG. 4 shows a flowchart of a method according to the second embodiment of the present invention.

Hereinafter, the method flow of the second detailed embodiment is described as follows in combination with FIG. 4 and referring to FIG. 3. As shown in FIG. 4, in the step S10', a base station generates a first TB according to a MCCH control signaling, and generates a second TB according to MTCH service data. Therefore, as shown in FIG. 3, MCCH control signaling and MTCH service data are multiplexed in a same sub-frame in the form of two TBs. Wherein it is specified that the resource allocated for the MCCH control signaling is fixed and is reserved in a predetermined position and has a determined size, which may be regularly reserved at the first symbol behind the two PDCCH symbols, for example. The remaining 9 RBs in the MBSFN sub-frame may be all used for the transmission of the MTCH service data.

Those skilled in the arts should understand that the two rectangles of the first TB and the second TB shown in FIG. 3 are only example, the first TB may be mapped on one or more RBs which may be discrete; the second TB may be mapped on one or more RBs which may be discrete. Therefore, actually, the patterns mapped in the MBSFN sub-frame by RBs may be irregular.

Then, in the step S12', the base station transmits the two TBs to the physical layer via the transmission channel MCH, and sends them to one or more UEs dominated by the base station.

Noticeably, the MCCH control signaling is sent to the HE only in the MBSFN sub-frame nearest to the start of MP and RP.

Then, in the step S13', the UE firstly receives from the base station the MBSFN sub-frame including MCCH control signaling in the period scheduled by MP and RP.

Then, in the step S14', the UE accordingly performs the subsequent operation such as decoding or demodulation, etc, according to for example the modulation and coding mode of the MCCH message obtained from the system message.

In a variation of the second embodiment, the method may further comprise the step S11' prior to the step S12'. In the step S11', the base station adds indication information for indicating the modulation and coding mode of the MCCH TB in two PDCCH symbols.

The advantages of the second detailed embodiment are:
extra information for indicating MCCH resource allocation and modulation and coding mode is not needed;
the exiting MBSFN sub-frame structure of PMCH is not changed.

However, the second detailed embodiment allocates resource for MCCH by regular reservation, and doesn't consider the different MCCH data size in practice. Therefore, comparing with the resource utilization rate of the first detailed embodiment, the resource utilization rate of the second detailed embodiment is relative low.

A Third Embodiment

Figure 5:
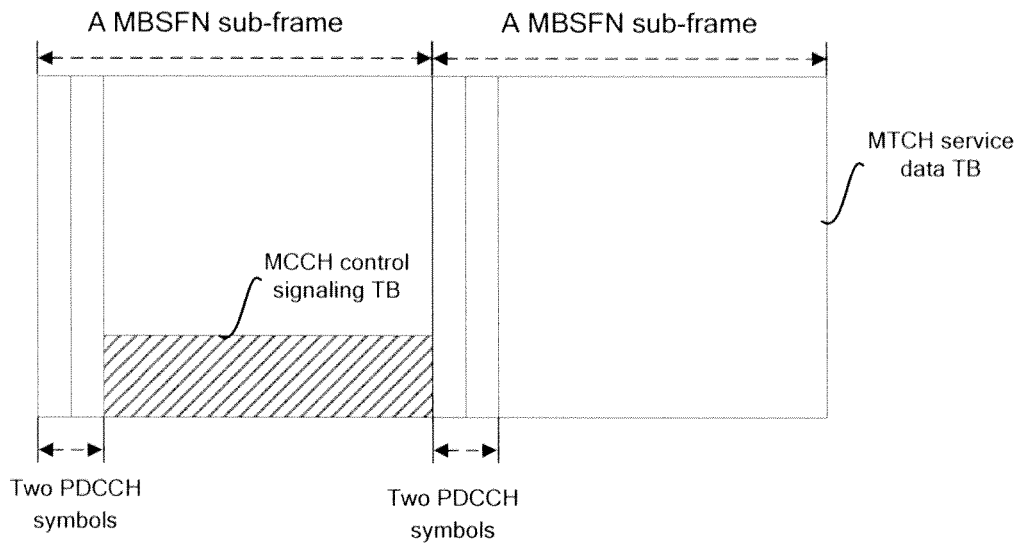
FIG. 5 shows a schematic diagram of MBSFN sub-frame structure for transmitting a MCCH control signaling, according to a third embodiment of the present invention.
Figure 6:
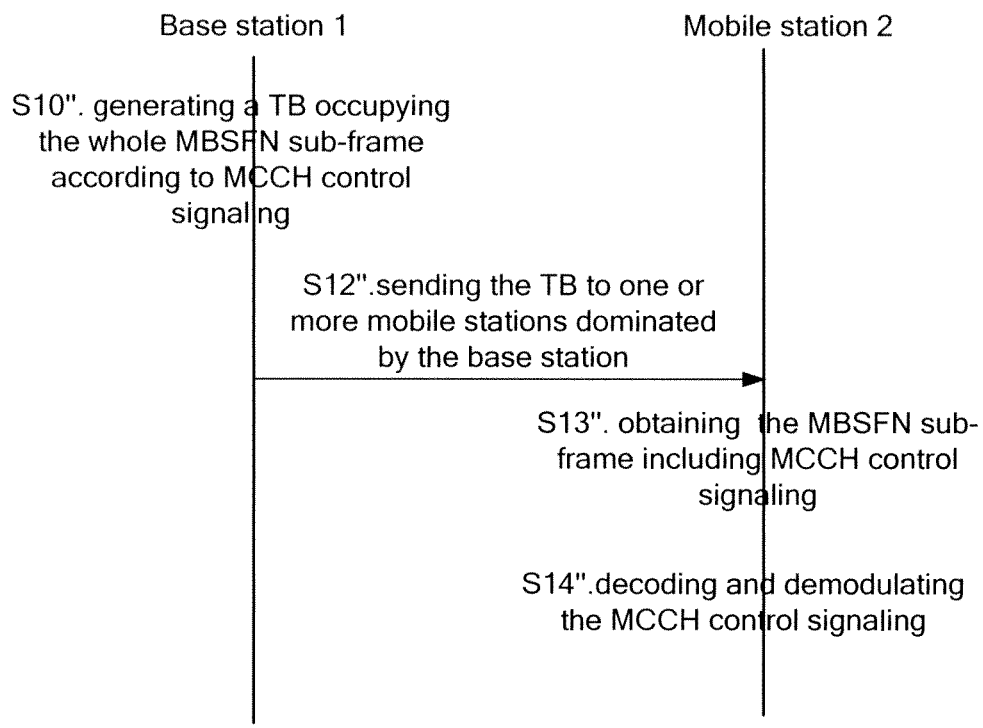
FIG. 6 shows a flowchart of a method according to the third embodiment of the present invention.

FIG. 5 shows a schematic diagram of MBSFN sub-frame structure for transmitting a MCCH control signaling, according to a third embodiment of the present invention, and FIG. 6 shows a flowchart of a method according to the third embodiment of the present invention.

Hereinafter, the method flow of the third detailed embodiment is described as follows in combination with FIG. 6 and referring to FIG. 5. As shown in FIG. 6, in the step S10", a base station exclusively encapsulates the MCCH control signaling as a MBSFN sub-frame. Therefore, as shown in FIG. 5, the TB of the MCCH control signaling occupies a MBSFN sub-frame, and the MCCH control signaling and the MTCH service data don't perform multiplexing, which means that the MCCH control signaling and the MTCH service data can not be transmitted in a MBSFN sub-frame simultaneously. Since the MCCH control signaling occupies the whole MBSFN sub-frame, and generally, resource allocation starts from the foremost resource from the start of the PDCCH symbol and the MCCH control signaling is sent to the UE only in the MBSFN sub-frame nearest to the start of MP and RP, therefore, in the third embodiment, indication information for indicating MCCH resource allocation is not needed as well.

Then, in the step S12", the base station transmits the TB to the physical layer via the transmission channel MCH, and sends it to one or more UEs dominated by the base station.

Noticeably, the MCCH control signaling is sent to one or more UEs only in the MBSFN sub-frame nearest to the start of MP and RP.

Then, in the step S13", the UE firstly receives from the base station the MBSFN sub-frame including MCCH control signaling in the period scheduled by MP and RP.

Then, in the step S14", the UE accordingly performs the subsequent operation such as decoding or demodulation, etc, according to for example the modulation and coding mode of the MCCH message obtained from the system message.

Those skilled in the arts should understand that the rectangle of the TB shown in FIG. 5 is only example, and the TB may be mapped on one or more RBs which may be discrete. Therefore, actually, the patterns mapped in the MBSFN sub-frame by RBs may be irregular.

In a variation of the third embodiment, the method may further comprise the step S11" prior to the step S12". In the step S11", the base station adds indication information for indicating the modulation and coding mode of the MCCH TB in two PDCCH symbols.

The advantage of the third detailed embodiment is:
extra information for indicating MCCH resource allocation and modulation and coding mode is not needed.

However, usually the data amount of the MCCH control signaling is less, so it is quite wasteful that the transmission of the MCCH control signaling occupies the whole sub-frame in the third embodiment.

A Fourth Embodiment

Figure 7:
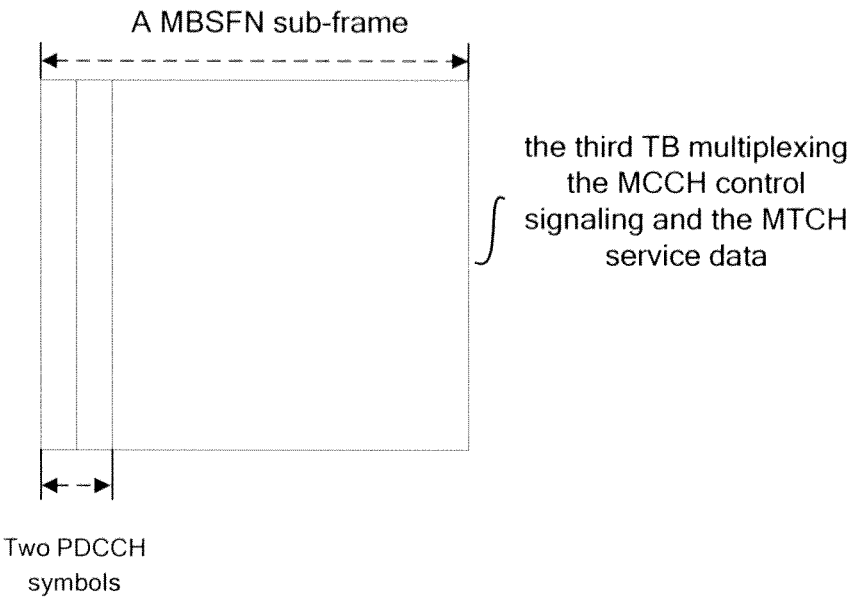
FIG. 7 shows a schematic diagram of MBSFN sub-frame structure for transmitting a MCCH control signaling, according to a fourth embodiment of the present invention.
Figure 8:
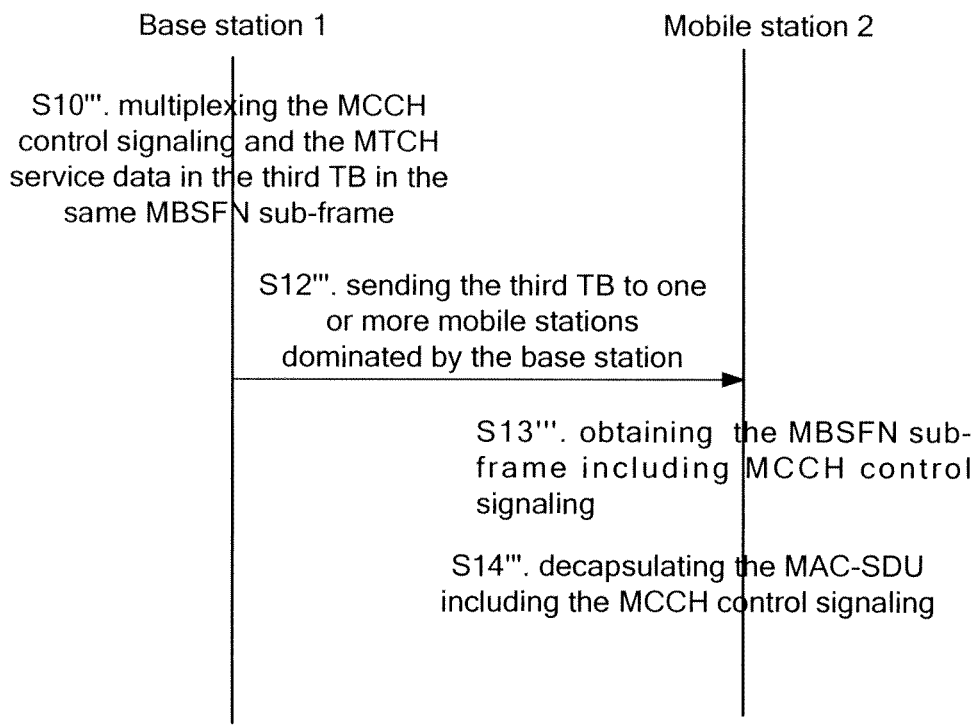
FIG. 8 shows a flowchart of a method according to the fourth embodiment of the present invention.

FIG. 7 shows a schematic diagram of MBSFN sub-frame structure for transmitting a MCCH control signaling, according to a fourth embodiment of the present invention, and FIG. 8 shows a flowchart of a method according to the fourth embodiment of the present invention.

Figure 9:
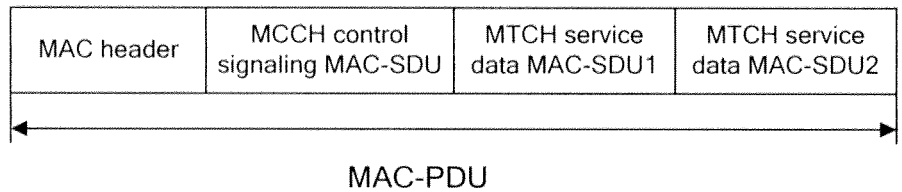
FIG. 9 shows a schematic diagram of the structure of a MAC-PDU according to the fourth embodiment of the present invention.

Hereinafter, the method flow of the fourth detailed embodiment is described as follows in combination with FIG. 8 and referring to FIG. 7. As shown in FIG. 8, in the step S10''', the MCCH control signaling and the MTCH service data are multiplexed in the third TB in the same MBSFN sub-frame. Those skilled in the art may understand that a TB corresponds to a PDU (Protocol Control Unit) of a MAC (Medium Access Control), that is, MAC-PDU. As shown in FIG. 9, in a MAC-PDU, since the MCCH and MTCH are different logic channels, the MCCH control signaling and the MTCH service data are respectively encapsulated in different SDUs (Service Data Unit). Different SDUs have different logic channel numbers and lengths. And there are length information and the corresponding logic channel number for each SDU in the MAC header. Therefore, in the fourth embodiment, indication information for indicating MCCH resource allocation is not needed as well, and the MCCH may be found by directly using the logic channel number in the MAC header.

Those skilled in the art may understand that a MAC-PDU corresponds to a modulation and coding mode. In the fourth embodiment, encapsulating the MCCH control signaling and the MTCH service data in the same MAC-PDU means that both use the same modulation and coding mode. However, generally, since the QoSs (Quality of Service) of the MCCH control signaling and the MTCH service data are different, usually the control signaling and the service data should be separated from each other. In the fourth embodiment, the MCCH control signaling and the MTCH service data are multiplexed in the same TB. Since the MCCH control signaling is more important than the MTCH service data, preferably, the QoS of the MCCH control signaling should be satisfied. That is, the modulation and coding multiplexing the MCCH control signaling and the MTCH service data should be subject to satisfying the MCCH control signaling, for example, when the QoS of the MCCH control signaling is higher than the QoS of the MTCH service data, the corresponding modulation and coding mode is selected according to the QoS of the MCCH control signaling to satisfy the demand for the QoS of the MCCH control signaling. Certainly, when the QoS of the MCCH control signaling is lower than the QoS of the MTCH service data, the corresponding modulation and coding mode may also be selected according to the QoS of the MCCH control signaling.

Then, in the step S12''', the base station transmits the third TB to the physical layer via the transmission channel MCH, and sends it to one or more UEs dominated by the base station.

Noticeably, the MCCH control signaling is sent to the UE only in the MBSFN sub-frame nearest to the start of MP and RP.

Then, in the step S13''', the UE firstly receives from the base station the MBSFN sub-frame including MCCH control signaling in the period scheduled by MP and RP.

Then, in the step S14''', the UE decapsulates the MAC-PDU, and finds out the MAC-SDU corresponding to the MCCH control signaling according to the length identifier of SDU and the corresponding logic number of SDU in the MAC header of the MAC-SDU, and performs the subsequent operation such as decapsulating, etc. for the MAC-SDU in which the MCCH control signaling is encapsulated.

The advantage of the fourth detailed embodiment is:
extra information for indicating MCCH resource allocation and modulation and coding mode is not needed.

However, multiplexing the MCCH control signaling and the MTCH service data in the same TB should use the same modulation and coding mode, but QoSs of the MCCH control signaling and the MTCH service data may be different.

The aforesaid embodiments are all described for the scenario of mapping the MCCH and MTCH on the MCH. In a varied embodiment, the MCCH may be mapped on the DL-SCH (DownLink-Shared Channel), which will be briefly described by taking the first embodiment and the fourth embodiment as example, hereinafter.

For example, in the variation of the first embodiment, still referring to FIG. 1, the TB of the MCCH control signaling in the MBSFN sub-frame may be mapped on the DL-SCH, and the TB of the MTCH service data is mapped on the MCH, therefore, the MBSFN transmission may be performed for MBMS service data.

Based on the plurality of aforesaid described transmission solutions of the MCCH control signaling, the technical solution of how to combine the notification identifier and the MCCH control signaling transmission in the present invention will be described hereinafter.

In the technical solution of how to combine the notification identifier and the MCCH control signaling transmission, involved in the present invention, the notification identifier is only included in the TB transmitted in the MP/RP period, that is, the notification identifier and the MCCH control signaling are transmitted in a TB, and the notification identifier is not included in those TBs in which only the MTCH service data is transmitted.

To be specific, a notification indicator is included in a TB which the base station sends in a MBSFN sub-frame in the MP/RP (Modulation period/Repetition period), and the notification indicator is used for informing whether a new service starts. Once the base station prepares to send a new service, it will activate the notification indicator in the RB to be sent at specific time, for example, the notification indicator is set to be 0 for the default; the base station will set the notification indicator to be 1 if a new service starts to be sent. Those skilled in the art should understand that the process of activating the notification indicator does not limited to the aforesaid setting the notification indicator to be 1 from 0, for example, it may also be setting the notification indicator to be 0 from 1, that is, the notification indicator is set to be 1 for the default; the base station will set the notification indicator to be 0 if a new service starts to be sent.

Preferably, as above described, the notification indicator is denoted with 1 bit, which may save the system resource effectively. However, those skilled in the art should understand that the size of the notification indicator is not limited to 1 bit.

As above mentioned, once the base station prepares to send a new service, it will actuate the notification indicator in the RB to be sent at specific time, which means that the base station will wait till the DRX period starts and actuate the notification indicator in the RB to be sent at the start of the DRX period once it prepares to send a new service. Therefore, the actuated notification indicator will appear in the TB sent in the DRX period. So for a UE in IDLE state, it needs only to receive TBs from the base station taking the DRX period as the receiving period, so as to judge whether the notification indicator in this TB is actuated.

It should be noted, as above mentioned, that the base station takes the DRX period as the period for actuating the notification indicator and the UE in IDLE state receives TBs from the base station in the DRX period to judge whether the notification indicator in this TB is actuated, is only an example, those skilled in the art should understand that the aforesaid period may be any one predefined period as long as the predefined period is multiples of MP and is known by all the UEs.

It should be also noted, as above mentioned, a TB which the base station sends in a MBSFN sub-frame in MP/RB may simultaneously include the MCCH TB and the MTCH TB, or only include the MCCH TB, or include a TB multiplexing the control signaling and service data. For the details the related description can be referred.

Hereinafter, referring to FIG. 10, a method of receiving MBMS by a UE will be described in detail according to an embodiment of the present invention.

Figure 10:
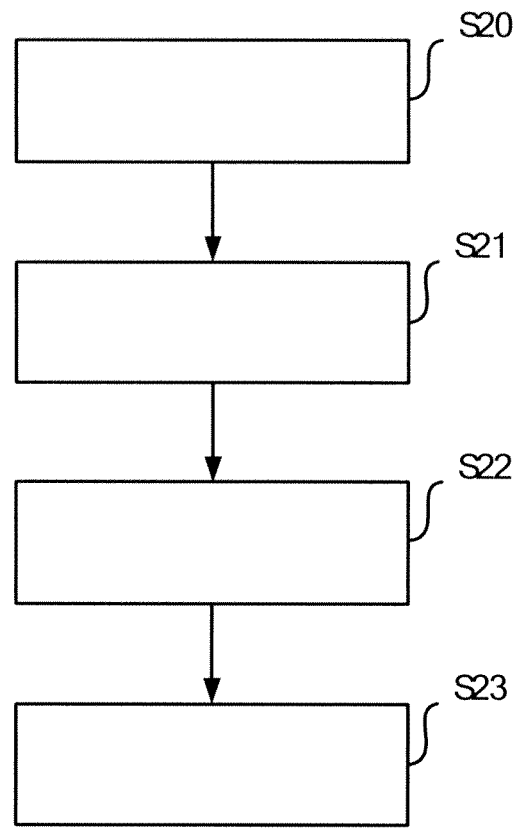
FIG. 10 shows a method of receiving a MBMS in a user equipment of a wireless communication system based on MBSFN transmission, according to an embodiment of the present invention.

It should be noted that the UE, involved in FIG. 10, is the UE in IDLE state in a cell, that is, the UE customizes one/some services, but the service does not start.

Firstly, in the step S20, the UE receives a TB from the base station in the DRX period.

To be specific, the TB is sent in a MBSFN sub-frame. Generally, the first two OFDM symbols of the sub-frame are OFDM symbols for PDCCH (Physical Downlink Control Channel), the remaining OFDM symbols are used for the transmission of the control signaling and the service data, certainly may also be only used for the transmission of the control signaling.

Secondly, in the step S21, the UE judges whether the notification indicator in the TB is actuated.

Preferably, the notification indicator is in the first two PDCCH symbols of the MBSFN sub-frame. Those skilled in the art should understand that the notification indicator may occupy any idle resource in the two PDCCH symbols. After the UE finishes receiving the TBs from the base station, it only needs to obtain the notification indicator from the first two PDCCH symbols, and then judges whether the notification indicator is actuated.

If the notification indicator is not actuated, the UE waits for the next DRX period to receive a TB from the base station.

If the notification indicator is actuated, then the method goes into the step S22, the UE judges whether a service identification of a multimedia broadcast/multicast service subscribed to by the UE is included in a TB including a control signaling in the TB.

To be specific, the TB may simultaneously include the MCCH TB and the MTCH TB, or only include the MCCH TB, or include a TB multiplexing the control signaling and service data. For the details the related description can be referred.

Because the base station will add the service identification of the new service in the modified services information in the TB comprising the control signaling before starting to transmitting the new service, if the UE judges that the notification indicator in the TB is actuated, then the UE may judges whether the new service to be transmitted by the base station is the subscribed to service according to the contents of the modified services information in the TB comprising the control signaling.

To be specific, the UE firstly demodulates and decodes the TB including the control signaling according to modulation and coding information of the TB including the control signaling.

Then, the UE obtains modified services information from the decoded and demodulated TB including the control signaling.

Finally, the UE judges whether the service identification of the multimedia broadcast/multicast service subscribed to by the UE is included in the modified services information.

If the service identification of the multimedia broadcast/multicast service subscribed to by the UE is not included in the modified services information, the UE waits for the next DRX period to receive a TB from the base station.

If the service identification of the multimedia broadcast/multicast service subscribed to by the UE is included in the modified services information, then, the method goes into the step S23, the UE receives the MBMS.

Furthermore, the UE firstly determines the time-frequency resource occupied during the transmission of the MBMS; then, the UE receives the MBMS on the determined time-frequency resource.

For the above described scenario that the MCCH control signaling and the MTCH service data are multiplexed in two TBs of a MBSFN sub-frame and the resource for MCCH TB is dynamically scheduled, preferably the notification indicator may be included in the downlink control information, wherein the downlink control information is in the first two PDCCH symbols of the MBSFN sub-frame.

To be specific, the DCI (Downlink Control Information) comprises position information of the TB including the control signaling in the TB which the UE receives from the base station, the modulation and coding information of the TB including the control signaling, and the notification indicator. Wherein, position information of the TB including the control signaling is used for indicating the RB occupied by the TB including the control signaling, and the UE may find out the TB including the control signaling from the received TB according to the position information. The modulation and coding information of the TB including the control signaling is used for indicating the modulation and coding mode used by the TB including the control signaling, and the UE may demodulate and decode the TB including the control signaling according to the modulation and coding mode.

Hereinafter, referring to FIG. 11, a method of receiving MBMS by a UE will be described in detail according to another embodiment of the present invention.

Figure 11:
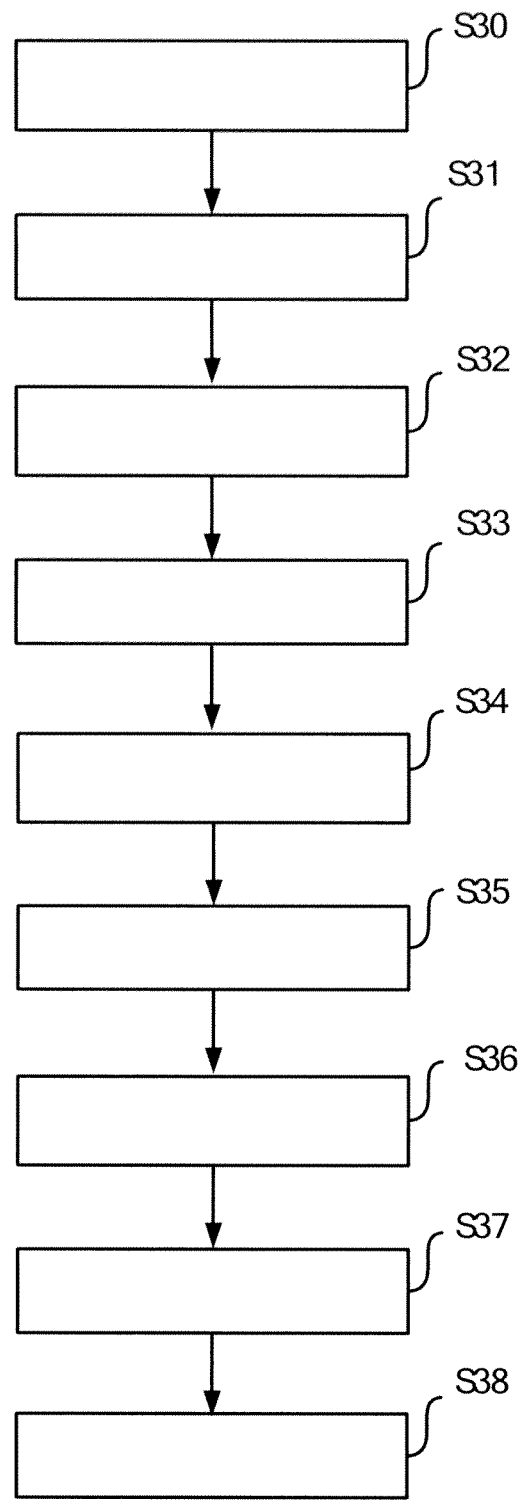
FIG. 11 shows a method of receiving a MBMS in a user equipment of a wireless communication system based on MB SFN transmission, according to another embodiment of the present invention.

It should be noted that the UE, involved in FIG. 11, is the UE in IDLE state in a cell, that is, the UE customizes one/some services, but the service does not start.

Firstly, in the step S30, the UE receives a TB from the base station in the DRX period.

Secondly, in the step S31, the UE obtains the DCI from the TB.

Next, in the step S32, the UE judges whether the notification indicator in the DCI is activated.

If the notification indicator is not activated, the UE waits for the next DRX period to receive a TB from the base station.

If the notification indicator is activated, the method goes into the step S33, the UE obtains the position information and the modulation and coding information of the TB including the control signaling from the DCI.

Then, in the step S34, the UE searches the TB including the control signaling in the received TB, according to the obtained position information.

Then, in the step S35, the UE decodes and demodulates the searched TB including the control signaling, according to the obtained modulation and coding information.

Next, in the step S36, the UE obtains modified services information from the decoded and demodulated TB including the control signaling.

Then, in the step S36, the UE judges whether the service identification of the multimedia broadcast/multicast service subscribed to by the UE is included in the modified services information.

If the service identification of the multimedia broadcast/multicast service subscribed to by the UE is not included in the modified services information, the UE waits for the next DRX period to receive a TB from the base station.

If the service identification of the multimedia broadcast/multicast service subscribed to by the UE is included in the modified services information, the method goes into the step S38, the UE receives the MBMS on the corresponding time-frequency resource.

The method flows involved in FIG. 10 and FIG. 11 are for the UE in IDLE state in a cell. If a UE just goes into the cell or power on, the UE will firstly receives the MCCH control signaling at the nearest RP, then judges whether the subscribed to service has started, according to modified services information and unmodified services information in the control signaling. If the subscribed to service starts, the UE receives the service data on the corresponding time-frequency resource; if the subscribed to service does not start, the UE may take DRX as the receiving period to judge whether the subscribed to service will start to be transmitted referring to the method flows shown in FIG. 1 and FIG. 2.

Once a UE starts to receive MBMS, the UE should take MP as the receiving period to receive the MCCH control signaling from the base station to judge whether the MCCH control signaling is updated, and the UE may know whether a new service starts by judging whether the MCCH control signaling is updated.

Some embodiments of the present invention is described from the aspect of method, it may be understood that the present invention may be implemented from the aspect of device as well. A control device according to an embodiment of the present invention may comprises the following means of:

a first receiving means, for receiving a TB from a base station in a predefined period.

Preferably, the predefined period is a DRX period.

To be specific, the TB is sent in a MBSFN sub-frame. Generally, the first two OFDM symbols of the sub-frame are OFDM symbols for PDCCH, the remaining OFDM symbols are used for the transmission of the control signaling and the service data, certainly may also be only used for the transmission of the control signaling.

A first judging means, for judging whether a notification indicator in the TB is activated.

Preferably, the notification indicator is in the first two PDCCH symbols of the MBSFN sub-frame. Those skilled in the art should understand that the notification indicator may occupy any idle resource in the two PDCCH symbols. After the UE finishes receiving the TBs from the base station, it only needs to obtain the notification indicator from the first two PDCCH symbols, and then judges whether the notification indicator is actuated.

A second judging means, for judging whether a service identification of a multimedia broadcast/multicast service subscribed to by the UE is included in a TB including a control signaling in the TB, if the notification indicator is activated.

To be specific, the TB may simultaneously include the MCCH TB and the MTCH TB, or only include the MCCH TB, or include a TB multiplexing the control signaling and service data. For the details the related description can be referred.

A second receiving means, for receiving the multimedia broadcast/multicast service, if the service identification of the multimedia broadcast/multicast service subscribed to by the UE is included in the TB including the control signaling.

Preferably, the second receiving means is also used for receiving the MBMS on the determined time-frequency resource.

Because the base station will add the service identification of the new service in the modified services information in the TB comprising the control signaling before starting to transmitting the new service, if the UE judges that the notification indicator in the TB is actuated, then the UE may judges whether the new service to be transmitted by the base station is the subscribed to service according to the contents of the modified services information in the TB comprising the control signaling.

To be specific, the second judging means comprises:

a first demodulating and decoding means, for decoding and demodulating the TB including the control signaling, according to obtained modulation and coding information;

a first obtaining means, for obtaining modified services information from the decoded and demodulated TB including the control signaling;

a third judging means, for judging whether the service identification of the multimedia broadcast/multicast service subscribed to by the UE is included in the modified services information.

For the scenario that the MCCH control signaling and the MTCH service data are multiplexed in two TBs of a MBSFN sub-frame and the resource for MCCH TB is dynamically scheduled, preferably the notification indicator may be included in the downlink control information, wherein the downlink control information is in the first two PDCCH symbols of the MBSFN sub-frame.

To be specific, the DCI (Downlink Control information) comprises position information of the TB including the control signaling in the TB which the UE receives from the base station, the modulation and coding information of the TB including the control signaling, and the notification indicator. Wherein, position information of the TB including the control signaling is used for indicating the RB occupied by the TB including the control signaling, and the UE may find out the TB including the control signaling from the received TB according to the position information. The modulation and coding information of the TB including the control signaling is used for indicating the modulation and coding mode used by the TB including the control signaling, and the UE may demodulate and decode the TB including the control signaling according to the modulation and coding mode.

Based on this, the first judging means further comprises:

a second obtaining means, for obtaining the DCI from the TB;

a fourth judging means, for judging whether the notification indicator in the DCI is activated.

The second judging means further comprises:

a third obtaining means, for obtaining the position information and the modulation and coding information of the TB including the control signaling from the DCI;

a searching means, for searching the TB including the control signaling in the TB, according to the position information;

a second demodulating and decoding means, for decoding and demodulating the searched TB including the control signaling, according to the modulation and coding information;

a fourth obtaining means, for obtaining modified services information from the decoded and demodulated TB including the control signaling;

a fifth judging means, for judging whether the service identification of the multimedia broadcast/multicast service subscribed to by the UE is included in the modified services information.

An assisting control device according to an embodiment of the present invention may comprise the following means of:

an activating means, for activating a notification indicator in a TB that is sent at starting time of a predefined period, before starting to transmit a new multimedia broadcast/multicast service;

a sending means, for sending the TB.

Wherein the activating means is further used for updating a TB including a control signaling in the TB, according to the new multimedia broadcast/multicast service.

Wherein the TB is transmitted in a MBSFN sub-frame, and the control signaling is a MCCH signaling.

Preferably, the predefined period is a DRX period.

Although the present invention is clarified and described in detail in drawings and the aforesaid description, it should be thought that the clarification and description are illustrative and exemplary, but not limited; the present invention is not limited to the aforesaid embodiments.

Those ordinary skilled in the art could understand and realize modifications to the disclosed embodiments, through studying the description, drawings and appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim.

The invention claimed is:

1. A method of receiving a service in a user equipment of a wireless communication system based on Multicast Broadcast Single Frequency Network (MBSFN) transmission, wherein the method comprises the following steps of:
   a. receiving a plurality of transport blocks from a base station in a predefined period;
   b. judging whether a notification indicator in a first transport block of the plurality of transport blocks is activated;
   c. judging whether a service identification of a multimedia broadcast/multicast service subscribed to by the user equipment is included in a second transport block of the plurality of transport blocks including a control signaling, if the notification indicator is activated, wherein the first and second transport blocks are different;
   d. receiving the multimedia broadcast/multicast service, if the service identification of the multimedia broadcast/multicast service subscribed to by the user equipment is included in the second transport block.

2. The method according to claim 1, wherein the step of judging whether the service identification of the multimedia broadcast/multicast service subscribed to by the user equipment is included in the second transport block comprises the following steps of:

I. decoding and demodulating the second transport block according to obtained modulation and coding information;

II. obtaining modified services information from the decoded and demodulated second transport block;

III. judging whether the service identification of the multimedia broadcast/multicast service subscribed to by the user equipment is included in the modified services information.

3. The method according to claim 1, wherein the step d further comprises the step of:

receiving the multimedia broadcast/multicast service on a determined time-frequency resource.

4. The method according to claim 1, wherein the first transport block comprises downlink control information, and the downlink control information comprises:

position information of the second transport block, position information of modulation and coding information of the second transport block, and position information of the notification indicator.

5. The method according claim 4, wherein the step b further comprises the following steps of:

b1. obtaining the downlink control information from the first transport block;

b2. judging whether the notification indicator in the downlink control information is activated.

6. A method of receiving a service in a user equipment of a wireless communication system based on Multicast Broadcast Single Frequency Network (MBSFN) transmission, wherein the method comprises the following steps of:

a. receiving a plurality of transport blocks from a base station in a predefined period;

b. judging whether a notification indicator in a first transport block of the plurality of transport blocks is activated;

c. judging whether a service identification of a multimedia broadcast/multicast service subscribed to by the user equipment is included in a second transport block of the plurality of transport blocks including a control signaling, if the notification indicator is activated;

d. receiving the multimedia broadcast/multicast service, if the service identification of the multimedia broadcast/multicast service subscribed to by the user equipment is included in the second transport block;

wherein the first transport block comprises downlink control information, and the downlink control information comprises:

position information of the second transport block, position information of modulation and coding information of the second transport block, and position information of the notification indicator;

wherein the step of judging whether the service identification of the multimedia broadcast/multicast service subscribed to by the user equipment is included in the second transport block comprises the following steps of:

i. obtaining the position information and the modulation and coding information of the second transport block from the downlink control information;

ii. searching the second transport block according to the position information;

iii. decoding and demodulating the searched second transport block according to the modulation and coding information;

iv. obtaining modified services information from the decoded and demodulated second transport block; and v. judging whether the service identification of the multimedia broadcast/multicast service subscribed to by the user equipment is included in the modified services information.

7. The method according to claim 4, wherein the second transport block includes service data.

8. The method according to claim 1, wherein the first transport block is transmitted in a MBSFN sub-frame, and the control signaling is a Multicast Control Channel (MCCH) signaling.

9. The method according to claim 1, wherein the predefined period is a Discontinuous Reception (DRX) period.

10. A method of assisting a user equipment to receive a multimedia broadcast/multicast service in a base station of a wireless communication system based on Multicast Broadcast Single Frequency Network (MBSFN) transmission, wherein the method comprises the following steps of:

A. in the base station, activating a notification indicator in a first transport block that is sent at a starting time of a predefined period, before starting to transmit a new multimedia broadcast/multicast service, and updating a second transport block including a control signaling, according to the new multimedia broadcast/multicast service, wherein the first and second transport blocks are different; and B. sending the first transport block.

11. The method according to claim 10, wherein the first transport block is transmitted in a MBSFN sub-frame, and the control signaling is a Multicast Control Channel (MCCH) signaling.

12. The method according to claim 10, wherein the predefined period is a Discontinuous Reception (DRX) period.

13. A user equipment of a wireless communication system based on Multicast Broadcast Single Frequency Network (MBSFN) transmission, comprising:

a receiver configured to receive a plurality of transport blocks from a base station in a predefined period;

at least one processor programmed to determine whether a notification indicator in a first transport block of the plurality of transport blocks is activated; and the at least one processor being programmed to determine whether a service identification of a multimedia broadcast/multicast service subscribed to by the user equipment is included in a second transport block of the plurality of transport blocks including a control signaling, if the notification indicator is activated, wherein the first and second transport blocks are different;

wherein the receiver is configured to receive the multimedia broadcast/multicast service, if the service identification of the multimedia broadcast/multicast service subscribed to by the user equipment is included in the second transport block.

14. A base station of a wireless communication system based on Multicast Broadcast Single Frequency Network (MBSFN) transmission, comprising:

at least one processor programmed to activate a notification indicator in a first transport block that is sent at a starting time of a predefined period, and to update a second transport block including a control signaling, according to a new multimedia broadcast/multicast service, wherein the first and second transport blocks are different, before starting to transmit the new multimedia broadcast/multicast service; and a transmitter configured to transmit the transport block.

15. A method of receiving a service in a user equipment of a wireless communication system based on Multicast Broadcast Single Frequency Network (MBSFN) transmission, wherein the method comprises the following steps of:
 a. receiving a plurality of transport blocks from a base station in a predefined period;
 b. judging whether a notification indicator in a given transport block of the plurality of transport blocks is activated;
 c. if the notification indicator is activated, judging whether a service identification of a multimedia broadcast/multicast service subscribed to by the user equipment is included in the given transport block; and
 d. receiving the multimedia broadcast/multicast service, if the service identification of the multimedia broadcast/multicast service subscribed to by the user equipment is included in the given transport block.

* * * * *